US008307209B2

(12) United States Patent
Ng

(10) Patent No.: US 8,307,209 B2
(45) Date of Patent: Nov. 6, 2012

(54) UNIVERSAL AUTHENTICATION METHOD

(76) Inventor: James Ng, Seattle, WA (US)

( * ) Notice: Subject to any disclaimer, the term of this patent is extended or adjusted under 35 U.S.C. 154(b) by 413 days.

(21) Appl. No.: 12/561,112

(22) Filed: Sep. 16, 2009

(65) Prior Publication Data

US 2010/0005303 A1 Jan. 7, 2010

Related U.S. Application Data

(63) Continuation of application No. 11/956,559, filed on Dec. 14, 2007, now abandoned.

(51) Int. Cl.
*H04L 9/00* (2006.01)
(52) U.S. Cl. ............................ 713/171; 713/168; 726/22
(58) Field of Classification Search .................. 713/171, 713/168; 726/22
See application file for complete search history.

(56) References Cited

U.S. PATENT DOCUMENTS

| | | | |
|---|---|---|---|
| 6,084,969 A * | 7/2000 | Wright et al. ................. | 380/271 |
| 7,155,607 B2 | 12/2006 | Yokota et al. | |
| 7,194,765 B2 | 3/2007 | Blom | |
| 7,194,766 B2 | 3/2007 | Noehring | |
| 7,197,640 B2 | 3/2007 | Meisel | |
| 7,353,385 B2 | 4/2008 | Nakano et al. | |
| 7,373,509 B2 * | 5/2008 | Aissi et al. .................... | 713/168 |
| 2002/0064279 A1 | 5/2002 | Uner | |
| 2002/0174335 A1 * | 11/2002 | Zhang et al. .................. | 713/168 |
| 2003/0110399 A1 | 6/2003 | Rail | |
| 2005/0114658 A1 | 5/2005 | Dye et al. | |
| 2007/0067829 A1 * | 3/2007 | Alrabady ............................ | 726/4 |
| 2007/0256140 A1 | 11/2007 | Venters, III et al. | |
| 2007/0256143 A1 | 11/2007 | Prafullchandra et al. | |
| 2008/0250481 A1 | 10/2008 | Beck et al. | |
| 2010/0316219 A1 * | 12/2010 | Boubion et al. .............. | 380/259 |

OTHER PUBLICATIONS

Alfred J. Menezes et al.; Handbook of Applied Cryptography; Copyright by CRC Press LLC 1997 excerpt from Chapter 10 (pp. 385-424).
Alfred J. Menezes et al.; Handbook of Applied Cryptography; Copyright by CRC Press LLC 1997; excerpt from Chapters 4, 8 and 11-13 (pp. 577-581).
Bruce Schneier; Applied Cryptography, 2nd Edition: Protocols, Algorithms, and Source Code in C; Copyright by Bruce Schneier 1997; Published by John Wiley & Sons, Inc. (pp. 4, 5, 17, 31-52, 97-100, 180-187, 466-474, 574-577, 588, 589, and 603-605).

* cited by examiner

*Primary Examiner* — Carl Colin
*Assistant Examiner* — Mohammad Siddiqi
(74) *Attorney, Agent, or Firm* — Lowe Graham Jones PLLC

(57) ABSTRACT

The object of the current invention is to provide the user with an authentication method that is more secure than conventional authentication methods and can be used on personal computers, PDAs, cell phones, personal digital media devices, home and car lock and security systems, television/VCR/DVD remote controls, credit card authentication systems, automatic teller machine authentication systems, among others.

12 Claims, 4 Drawing Sheets

Two-way universal authentication method

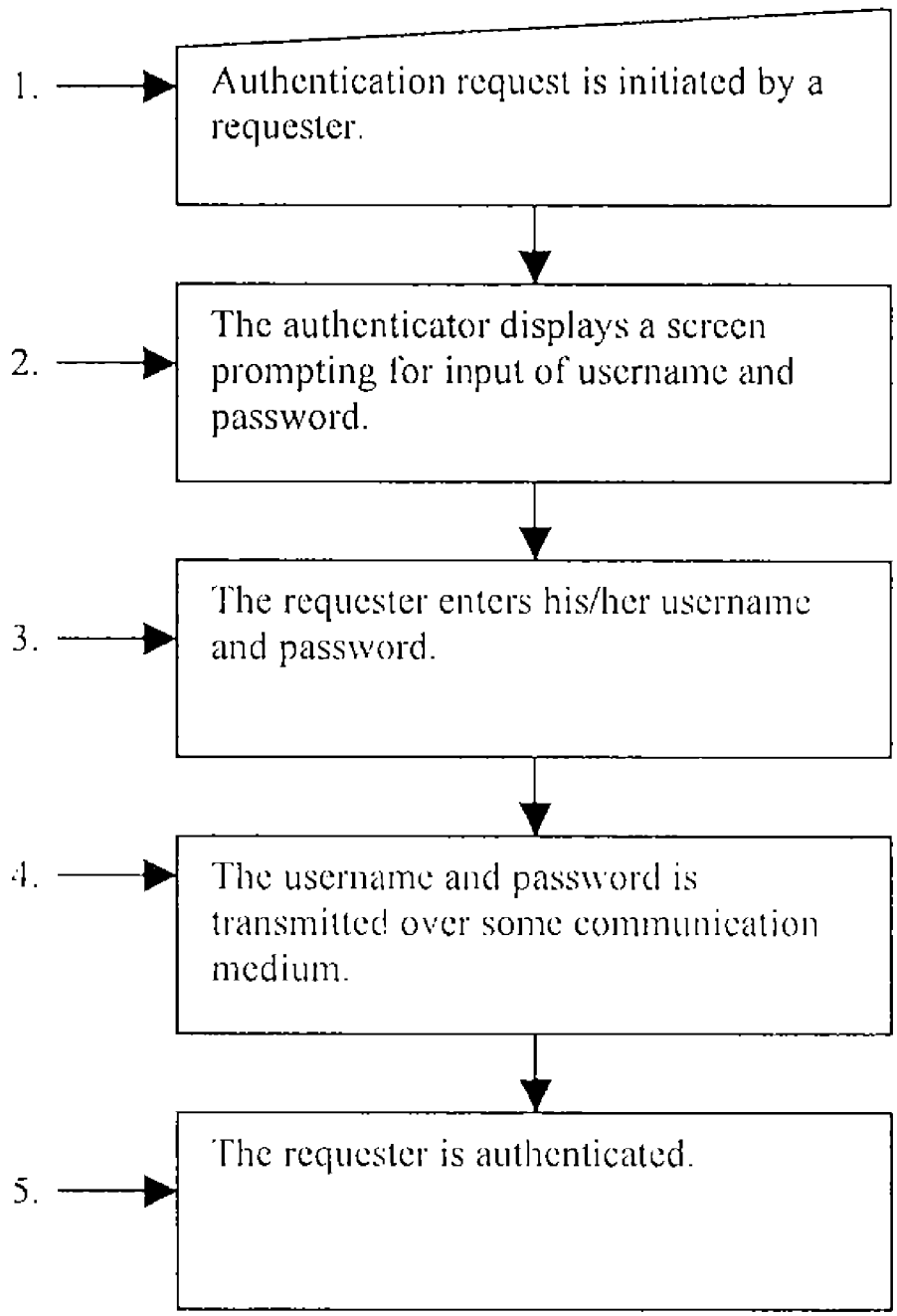
Figure 1. Conventional authentication system.

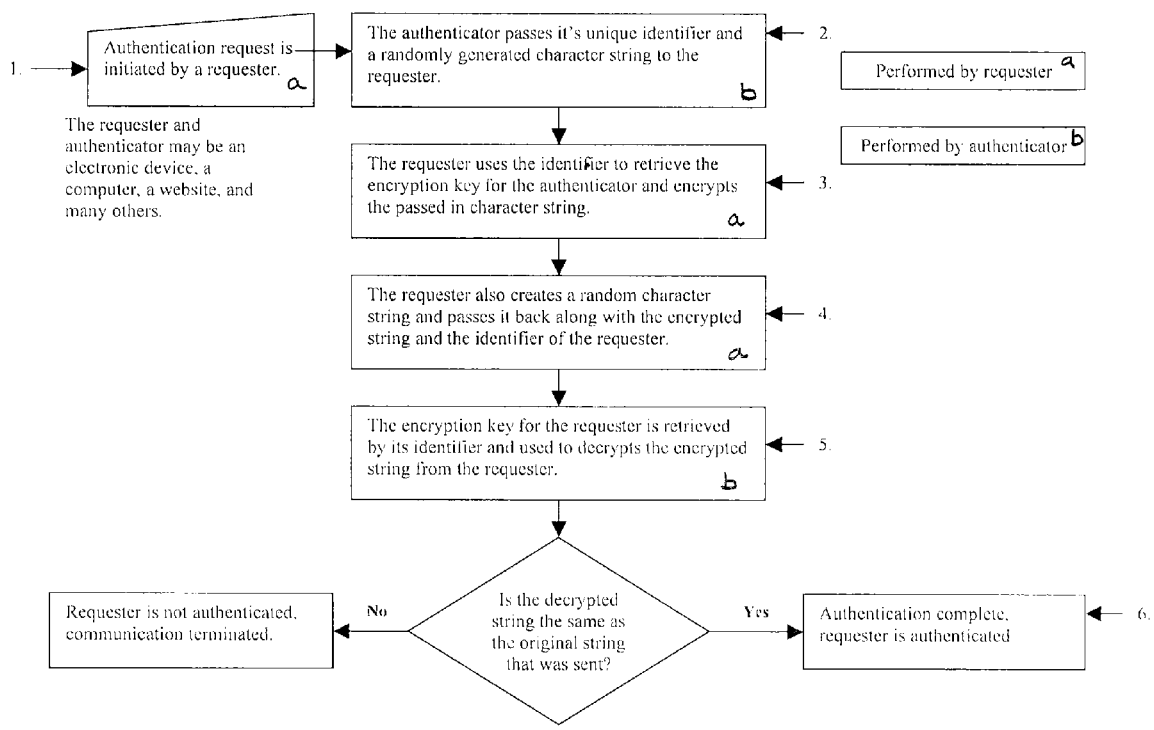
Figure 2. One-way universal authentication method

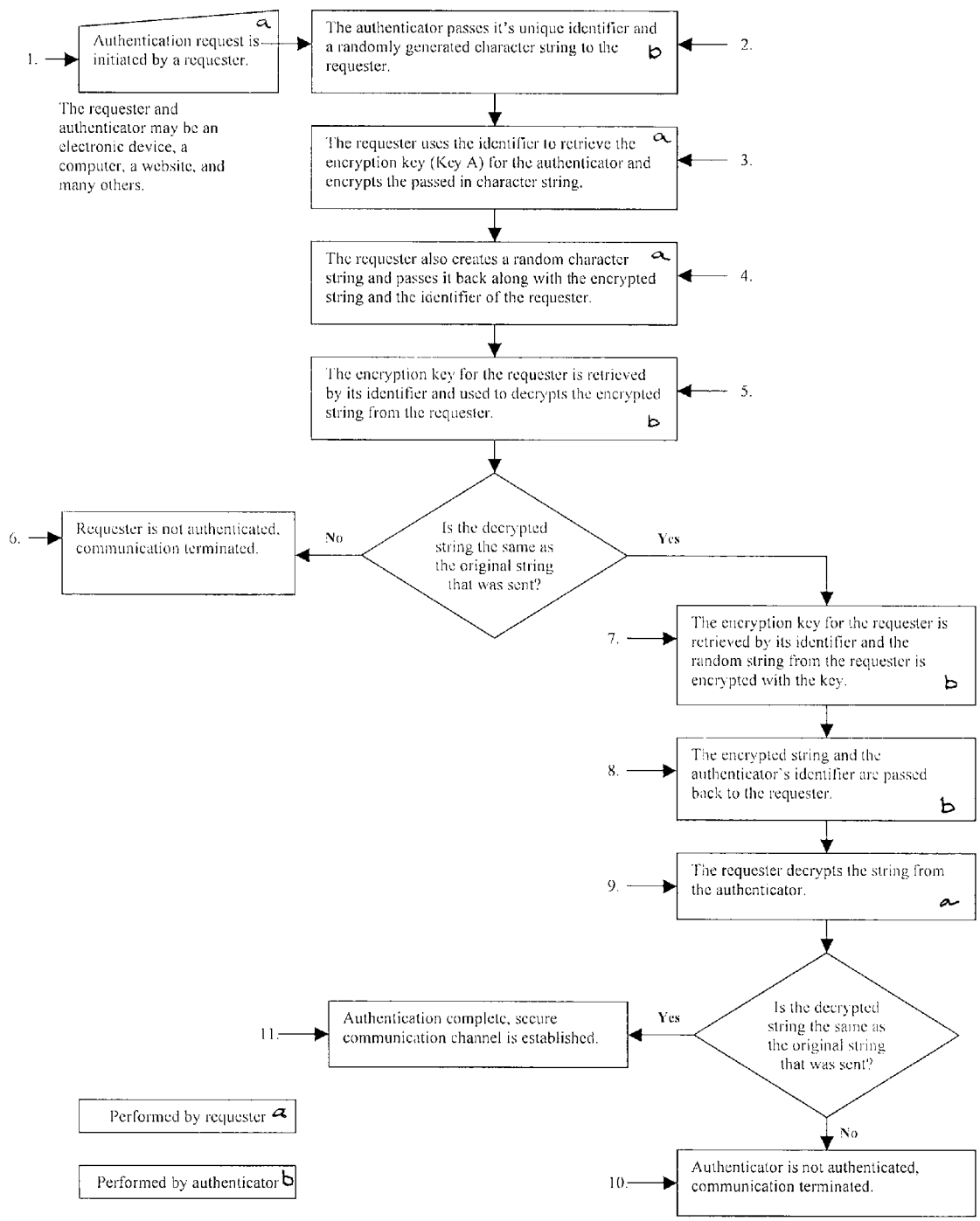
Figure 3. Two-way universal authentication method

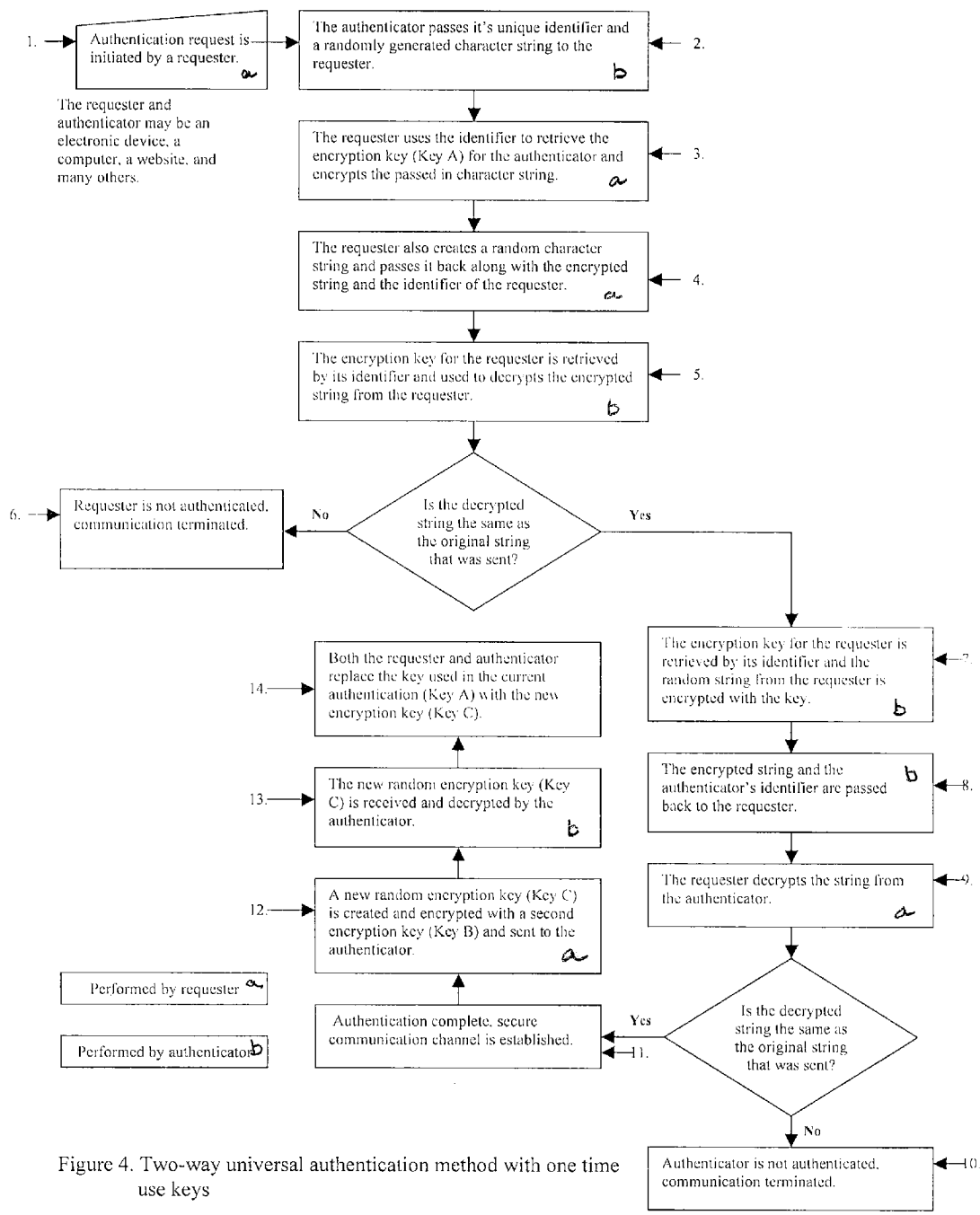
Figure 4. Two-way universal authentication method with one time use keys

UNIVERSAL AUTHENTICATION METHOD

CROSS-REFERENCES TO RELATED APPLICATIONS

This is a Continuation of application Ser. No. 11/956,559, filed on 14 Dec. 2007, now pending and hereby incorporates by reference, that application in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

On a daily basis, most modern men interface with multiple electronic systems such as personal computers, personal digital media devices, cell phones, PDA, among others. Each electronic system has a different passwords requiring modern man to remember a multitude of information that can be easily lost or stolen. The amount of information modern man is required to remember increases substantially when one accounts for the passwords and/or usernames needed to use applications, including but not limited to web sites, which are run on the electronic systems.

Passwords are limited in length and content by what a user can remember. Additionally, conventional authentication systems are easily infiltrated because both the authentication code and password are stored within the system. Consequently, if a laptop, for example, is stolen, the data stored within is easily accessible.

Information relevant to attempts to address these problems can be found in Blom, U.S. Pat. No. 7,194,765; Yokota et. al., U.S. Pat. No. 7,155,607; Venters, III et. al., US Publication No. 2007/0256140; Prafullchandra et. al., US Publication No. 2007/0256143. However, each of these references suffers from one or more of the following disadvantages:
(a) does not provide a check for bogus websites which will replicate the identifier;
(b) passes passwords over a wire where it can be intercepted by unauthorized users; and
(c) passwords are limited in size and type.

The object of the current invention is to provide the user with an authentication method that is more secure than conventional authentication methods and can be used on personal computers, PDAs, cell phones, personal digital media devices, home and car lock and security systems, television/VCR/DVD remote controls, credit card authentication systems, automatic teller machine authentication systems, among others.

BRIEF SUMMARY OF THE INVENTION

The present invention is directed to an universal authentication method that is more secure than conventional methods found on most electronic systems. The universal authentication method does not send passwords over hard wires or wireless systems. Consequently, it is difficult for would be password thief to intersect password data. It can provide a further layer of security by providing rotating security information.

The universal authentication method also provides security against a "man in the middle" type scam. Scammers will e-mail an unsuspecting internet user about problems with his bank account, for example, and request the user to rectify the problems providing a link to follow. The link takes the user to a websites that looks exactly like the bank's website. When the user enters his username and password to this bogus website, the information is passed on to the real bank website allowing the scammer access to the user's bank account. The universal authentication method provides web site authentication security by using the website name as an identifier and adding the IP address of the website as part of the encryption key. And, because users do not need to remember or generate passwords, the encryption key can be totally random in size and nature.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which:

FIG. 1 is a flow chart showing a conventional authentication method;

FIG. 2 is a flow chart showing the one-way universal authentication method;

FIG. 3 is a flow chart showing the two-way universal authentication method;

FIG. 4 is a flow chart showing two-way universal authentication method which utilizes a one time authentication key.

DETAILED DESCRIPTION OF THE INVENTION

The universal authentication method is a challenge-response method which does not require the user to generate or remember passwords. It may reside on the electronic system as an auxiliary application or reside on the hardware specific for the authentication method. The term electronic system(s) is used to describe systems such as personal computers, personal digital media devices, cell phones, PDAs, among others. The universal authentication method can be used for one and two way authentication. In the universal authentication method the challenger or requester can be either the user or the electronic system.

FIG. 1 is a flow chart showing conventional authentication methods. In conventional authentication methods the authenticator (1) is the electronic system. The authenticator displays a screen prompting for username and password or password (2). The user or requester enters his username and password or password (3). The username and password is transmitted over some communication medium (4) and the requester is authenticated (5).

Because the human requester can remember only a limited number and type of symbols, usernames and passwords are limited in size and content. Conventional authentication methods also allow a would be thief easy access to passwords and usernames. Additionally, electronic systems that use the conventional authentication method usually store usernames and passwords within the electronic system. If, for example, an electronic system is stolen, a thief can, by using the numerous brute force programs available, determine the usernames and passwords to that particular electronic system as well as usernames and passwords that may be stored in the electronic system for other electronic system. Some electronic systems accept authentication data via internet protocol technology. This requires the user to pass along his username and password through cyberspace; a place where this information can be intercepted. The universal authentication method removes these barriers, among others, by removing the human user from the equation. The universal authentication method comprises methods for one-way authentication, two-way authentication, and two-way authentication which utilizes one time authentication keys.

FIG. 2 is a flow chart showing one-way universal authentication method. In one-way authentication the requester makes a request for authentication to the authenticator (1). The authenticator passes its unique identifier and randomly generated character string to the requester (2). The requester uses the identifier to retrieve an encryption key for the authenticator and encrypts the passed in randomly generated character string (3). The encrypted randomly generated character string, and an identifier which uniquely identifies the requester, is passed back to the authenticator (4). The authenticator retrieves the encryption key, which corresponds to the identifier, and decrypts the encrypted string (5). If the decrypted character string matches the random character string sent in the initial request, the requester is authenticated (6).

FIG. 3 is a flow chart showing two-way authentication. In two way authentication the requester makes a request for authentication to the authenticator (1). The authenticator passes its unique identifier and randomly generated character string to the requester (2). The requester uses the identifier to retrieve an encryption key for the authenticator and encrypts the randomly generated passed in character string (3). The encrypted character string, an identifier which uniquely identifying the requester, and a new randomly generated character string is passed back to the authenticator (4). The authenticator retrieves the encryption key corresponding to the received identifier, and decrypts the encrypted character string (5). If the decrypted character string does not match the random character string sent in the initial request, authentication fails and communication is terminated (6).

If the decrypted character string matches the random character string sent in the initial request, the random character string from the requester is encrypted (7). The encrypted character string is passed back to the requester along with the authenticator's identifier (8). The requester uses the identifier to retrieve the encryption key for the authenticator and decrypts the encrypted string (9). If the decrypted character string matches the random character string sent in the initial request, both parties are authenticated (11).

FIG. 4 is a flow chart showing the two-way universal authentication method which utilizes one time authentication keys. In two way authentication which utilizes one time authentication keys, the requester makes a request for authentication to the authenticator (1). The authenticator passes its unique identifier and randomly generated character string to the requester (2). The requester uses the identifier to retrieve a one time encryption key (eg. Key A) for the authenticator and encrypts the randomly generated passed in character string (3). The encrypted character string, an identifier which uniquely identifying the requester, and a new randomly generated character string is passed back to the authenticator (4). The authenticator retrieves the encryption key (eg. Key A) corresponding to the received identifier, and decrypts the encrypted character string (5). If the decrypted character string does not match the random character string sent in the initial request, authentication fails and communication is terminated (6).

If the decrypted character string matches the random character string sent in the initial request, the random character string from the requester is encrypted (7). The encrypted character string is passed back to the requester along with the authenticator's identifier (8). The requester uses the identifier to retrieve the encryption key for the authenticator and decrypts the encrypted string (9). If the decrypted character string matches the random character string sent in the initial request, both parties are authenticated (11).

A new random encryption key (eg. Key C) is then created and encrypted with the next encryption key in the rotation (eg. Key B) and sent to the authenticator (12). The new random encryption key (eg. Key C) is received and decrypted by the authenticator (13). Both the requester and authenticator replace the key use in the current authentication (eg. Key A) with the new encryption key (eg. Key C) (14).

The following is an example how the requested random encryption keys will cycle through the authentication process. Encryption Key A is used once and discarded. The next time through the authentication method the system will use Key B to encrypt and decrypt the random string, and used Key C to transmit the new Key D. The next time the system will use Key C and Key D. It is important to note that each encryption key is used only once. The number of keys held by the requester and authenticator can be predetermined. For example, if the predetermined number of keys is 5 and Keys A, B, C, D, E are the first set of authentication keys, then Keys B, C, D, E, F will be the second set of authentication Keys, Keys C, D, E, F, G will be the third set of authentication keys, etc.

In the two-way universal authentication method the universal authentication system can use either one or two encryption keys per authentication. When two encryption keys are used, one key is designated for incoming requests and another is designated for outgoing responses. If one time keys are to be used, both keys would be replaced after each authentication. Users of the universal authentication method can also request rotating encryption key(s); either a single encryption key or one encryption key for incoming requests and one encryption key for outgoing responses. For website authentication, the IP address of the requester and authenticator can be added as part of the encryption key(s) to prevent "man in the middle" scams.

In view of the above, it will be seen that various aspects and features of the invention are achieved and other results and advantages can be attained. While preferred embodiments of the invention have been shown and described, it will be obvious to those skilled in the art that changes and modification may be made therein without departing from the invention in its broader aspects.

What is claimed:

1. A method for two-way authentication using a challenge and response system where a requester apparatus initiates a request for authentication to an authenticator apparatus, the method comprising the steps of:

the authenticator apparatus passing its unique identifier and a randomly generated character string to the requester apparatus;

the requester apparatus using the identifier to retrieve an encryption key for the authenticator apparatus and encrypting the passed in randomly generated character string;

passing the encrypted character string, a unique identifier of the requester apparatus, and a new randomly generated character string back to the authenticator apparatus;

the authenticator apparatus retrieving an encryption key corresponding to the received identifier and decrypting the passed back encrypted character string;

determining that authentication fails and terminating communication when the decrypted character string does not match the random character string sent in the initial request;

encrypting the random character string from the requester apparatus;

passing the encrypted character string back to the requester apparatus with the unique identifier of the authenticator apparatus;

the requester apparatus using the identifier to retrieve the encryption key for the authenticator apparatus and decrypting the encrypted character string;

determining that both parties are authenticated when the decrypted character string matches the random character string sent in the initial request; and replacing encryption keys by:
- the authenticator apparatus creating a second one-time encryption key, encrypting the second one-time encryption key using a third one-time encryption key, and transmitting the encrypted second one-time encryption key to the requester apparatus;
- the requester apparatus decrypting the encrypted second one-time encryption key with the third one-time encryption key; and
- the requester apparatus and authenticator apparatus each replacing the first one-time encryption key with the second one-time encryption key.

2. The method of claim 1, further comprising using a first encryption key for incoming requests and a second encryption key for outgoing requests, the first and second encryption keys being different from one another.

3. The method of claim 1, further comprising determining an encryption key from a plurality of rotating encryption keys.

4. The method of claim 3, wherein determining the encryption key is based on a predefined pattern in the randomly generated character string passed to the requester apparatus.

5. The method of claim 1, further comprising authenticating a website by using a website name as an identifier.

6. The method of claim 1, further comprising using an IP address of the website as part of the encryption key for the authenticator apparatus.

7. The method of claim 1, further comprising:
the requester apparatus generating a new random encryption key;
the requester apparatus encrypting the new encryption key with a next encryption key in a plurality of rotating encryption keys;
the requester apparatus transmitting the encrypted new encryption key to the authenticator apparatus; and
the authenticator apparatus and the requester apparatus each discarding the encryption key used in a current authentication and replacing it with the new encryption key for use in a next authentication.

8. The method of claim 1, further comprising using one-time encryption keys by replacing encryption keys after each authentication.

9. A two-way authentication method that utilizes one-time authentication keys, the method comprising:
a first apparatus passing a unique identifier of the first apparatus and a first randomly generated character string to a second apparatus;

the second apparatus using the unique identifier of the first apparatus to retrieve a first one-time encryption key for the first apparatus and encrypting the first randomly generated character string;

the second apparatus passing the encrypted first randomly generated character string, a unique identifier of the second apparatus, and a second randomly generated character string back to the first apparatus;

the first apparatus retrieving the first one-time encryption key and decrypting the encrypted first randomly generated character string with the first one-time encryption key;

determining that authentication fails and terminating communication when the decrypted character string does not match the first randomly generated character string;

encrypting the second randomly generated character string;

passing the encrypted second randomly generated character string back to the second apparatus along with the unique identifier of the first apparatus;

the second apparatus retrieving the first one-time encryption key and decrypting the encrypted second randomly generated character string with the first one-time encryption key;

determining that both parties are authenticated when the decrypted character string matches the second randomly generated character string; and replacing encryption keys by:
- the second apparatus creating a second one-time encryption key, encrypting the second one-time encryption key using a third one-time encryption key, and transmitting the encrypted second one-time encryption key to the first apparatus;
- the first apparatus decrypting the encrypted second one-time encryption key with the third one-time encryption key; and
- the second apparatus and first apparatus each replacing the first one-time encryption key with the second one-time encryption key.

10. The method of claim 9 wherein the first apparatus is a computing system hosting a website and the second apparatus is computing system of a user.

11. The method of claim 10 wherein the unique identifier of the first apparatus includes a name of the website and an IP address of the computing system hosting the website.

12. The method of claim 9 wherein different keys are used for incoming and outgoing requests processed by the first and second apparatuses.

* * * * *